United States Patent
Shibata

(10) Patent No.: US 6,917,650 B2
(45) Date of Patent: Jul. 12, 2005

(54) IMAGE MOTION DETECTING CIRCUIT

(75) Inventor: Hideaki Shibata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 595 days.

(21) Appl. No.: 10/154,783

(22) Filed: May 28, 2002

(65) Prior Publication Data

US 2002/0176501 A1 Nov. 28, 2002

(30) Foreign Application Priority Data

May 28, 2001 (JP) ........................................ 2001-158741

(51) Int. Cl.[7] .............................................. H04N 7/12
(52) U.S. Cl. ................ 375/240.16; 382/236; 348/416.1
(58) Field of Search ..................... 375/240.16; 382/224, 382/236, 305; 348/699, 700, 416.1; 707/104.1

(56) References Cited

U.S. PATENT DOCUMENTS

| | | | | |
|---|---|---|---|---|
| 4,884,136 A | * | 11/1989 | Ninomiya et al. | 348/701 |
| 4,953,032 A | * | 8/1990 | Suzaki et al. | 348/722 |
| 5,488,430 A | * | 1/1996 | Hong | 348/699 |
| 6,665,442 B2 | * | 12/2003 | Sekiguchi et al. | 382/224 |

FOREIGN PATENT DOCUMENTS

JP         63070689         3/1988

OTHER PUBLICATIONS

Irena Koprinska et al., "Temporal video segmentation: A survey", Signal Processing: Image Communication, Elsevier Science Publishers, Amsterdam, NL, vol. 16, No. 5, Jan. 2001, pp. 477–500.

G. Lupatini et al., "Scene break detection: a comparison", Research Issues in Data Engineering, 1998, 'Continuous-Media Databases and Applications', Proceedings, Eighth International Workshop on Orlando, FL, USA Feb. 23–24, 1998, Los Alamitos, CA, USA IEEE Comput. Soc, US, Feb. 23, 1998, pp. 34–41.

* cited by examiner

Primary Examiner—Gims Philippe
(74) Attorney, Agent, or Firm—Wenderoth, Lind & Ponack, L.L.P.

(57) ABSTRACT

An image motion detecting circuit and an image motion detecting method of the present invention can accurately detect motion of such an image sequence that different still pictures are connected with each other. Inter-frame difference absolute values of an inputted image signal during a predetermined frame period are held by plural registers 105. Then, the maximum value is extracted from the inter-frame difference absolute values which are held by the plural registers 105, and the extracted maximum value is subtracted from the sum of the inter-frame difference absolute values during the predetermined frame period, thereby detecting the motion of the whole image sequence.

4 Claims, 4 Drawing Sheets

IMAGE MOTION DETECTING CIRCUIT

FIELD OF THE INVENTION

The present invention relates to an image motion detecting circuit and an image motion detecting method for detecting an amount of motion corresponding to a whole image sequence of a television signal or the like.

BACKGROUND OF THE INVENTION

As an example of a prior art relating to a circuit for detecting motion of a television signal or the like, a motion detecting circuit described in Japanese Patent No. 2585544 is known. FIG. 4 is a block diagram illustrating a structure of the motion detecting circuit that is disclosed in this literature. This motion detecting circuit includes, as shown in FIG. 4, an input terminal 401, a frame memory 402, a subtracter 403, a motion information conversion circuit 404, an integration circuit 405, and an output terminal 406. A television signal that is inputted through the input terminal 401 is inputted to the frame memory 402. The subtracter 403 calculates a difference between input and output of the frame memory 402, i.e., difference between frames (inter-frame difference). Subsequently, the motion information conversion circuit 404 converts the inter-frame difference signal into a signal representing motion. The integration circuit 405 integrates information of motions of the same pixel or peripheral pixels over a limited frame cycle in the past. Through the above operation, the prior art motion detecting circuit can output the motion information from the output terminal 406.

However, because the conventional motion detecting circuit converts the absolute value of the inter-frame difference into the motion information and then integrates the motion information over a predetermined period in the past, when a still picture is connected with another still picture, i.e., when a so-called scene change occurs, a large inter-frame difference is unfavorably calculated. As a result, a motion of the whole image sequence is adversely detected as a large motion, resulting in a degradation in the motion detection accuracy.

Though this degradation does not matter when the period for integrating the motion information is sufficiently long, this degradation causes a serious problem when the integration period is shorter.

Further, since the integration period corresponds to the time that is required for the motion detection, the integration period is desired to be shortened in view of memory reduction.

SUMMARY OF THE INVENTION

The present invention has for its object to provide an image motion detecting circuit and an image motion detecting method, which can accurately perform motion detection for an image sequence which comprises different still pictures being connected with each other.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided an image motion detecting circuit including: a first extraction means for extracting an inter-frame difference absolute value from an inputted image signal in units of frames; N pieces (N is a natural number that is equal to or larger than 4) of holding means each holding the inter-frame difference absolute value; a second extraction means for extracting M pieces (M is a natural number that is equal to or larger than 1 and equal to or smaller than N/4) of the inter-frame difference absolute values starting from a largest one, from the one inter-frame difference absolute value that is extracted by the first extraction means and the N pieces of inter-frame difference absolute values which are held by the holding means; and an addition means for adding the (N+1) pieces of inter-frame difference absolute values, except for the extracted M pieces of inter-frame difference absolute values. Therefore, even for an image sequence which comprises different still pictures being connected with each other, motion of the image sequence can be detected with ignoring the connection point, resulting in an increased accuracy in detecting the motion of the whole image. This apparatus is greatly effective, particularly when a period for detecting the motion of the image sequence is to be shortened.

According to a 2nd aspect of the present invention, there is provided an image motion detecting circuit including: a first extraction means for extracting an inter-frame difference absolute value from an inputted image signal in units of frames; a second extraction means for extracting an accumulated value of horizontal adjacent pixel differences from the inputted image signal in units of frames; a calculation means for calculating a frame motion amount from the inter-frame difference absolute value and the accumulated value of the horizontal adjacent pixel differences; N pieces (N is a natural number that is equal to or larger than 4) of holding means each holding the frame motion amount; a third extraction means for extracting M pieces (M is a natural number that is equal to or larger than 1 and equal to or smaller than N/4) of the frame motion amounts starting from a largest one, from the one frame motion amount that is calculated by the calculation means and the N pieces of frame motion amounts which are held by the holding means; and an addition means for adding the (N+1) pieces of frame motion amounts, except for the extracted M pieces of frame motion amounts. Therefore, the motion amount which does not depend on the spatial frequency is calculated in units of frames, and even for an image sequence which comprises different still pictures being connected with each other, the motion of the image sequence can be detected with ignoring the connection point, resulting in an increased accuracy in detecting the motion of the whole image sequence. This apparatus is greatly effective, particularly when a period for detecting the motion of the image sequence is to be shortened.

According to a 3rd aspect of the present invention, there is provided an image motion detecting method including: a first extraction step of extracting an inter-frame difference absolute value from an inputted image signal in units of frames; a holding step of holding N pieces (N is a natural number that is equal to or larger than 4) of the inter-frame difference absolute values; a second extraction step of extracting M pieces (M is a natural number that is equal to or larger than 1 and equal to or smaller than N/4) of the inter-frame difference absolute values starting from a largest one, from the one inter-frame difference absolute value that is extracted in the first extraction step and the N pieces of inter-frame difference absolute values which are held in the holding step; and an addition step of adding the (N+1) pieces of inter-frame difference absolute values, except for the extracted M inter-frame difference absolute values.

Therefore, even for an image sequence which comprises different still pictures being connected with each other, motion of the image sequence can be detected with ignoring the connection point, resulting in an increased accuracy in detecting the motion of the whole image. This method is greatly effective, particularly when a period for detecting the motion of the image sequence is to be shortened.

According to a 4th aspect of the present invention, there is provided an image motion detecting method including: a first extraction step of extracting an inter-frame difference absolute value from an inputted image signal in units of frames; a second extraction step of extracting an accumulated value of horizontal adjacent pixel differences from the inputted image signal in units of frames; a calculation step of calculating a frame motion amount from the inter-frame difference absolute value and the accumulated value of the horizontal adjacent pixel differences; a holding step of holding N pieces (N is a natural number that is equal to or larger than 4) of the inter-frame motion amounts; a third extraction step of extracting M pieces (M is a natural number that is equal to or larger than 1 and equal to or smaller than N/4) of the frame motion amounts starting from a largest one, from the one frame motion amount that is calculated in the calculation step and the N pieces of frame motion amounts which are held in the holding step; and an addition step of adding the (N+1) pieces of frame motion amounts, except for the extracted M pieces of frame motion amounts. Therefore, the motion amount which does not depend on the spatial frequency is calculated in units of frames, and even for an image sequence which comprises different still pictures being connected with each other, the motion of the image sequence can be detected with ignoring the connection point, resulting in an increased accuracy in detecting the motion of the whole image sequence. This method is greatly effective, particularly when a period for detecting the motion of the image sequence is to be shortened.

DETAILED DESCRIPTION OF THE PREFERRED EMBODIMENTS

Hereinafter, embodiments of image motion detecting circuits according to the present invention will be described with reference to FIGS. 1 to 3.

[Embodiment 1]

Figure 1:
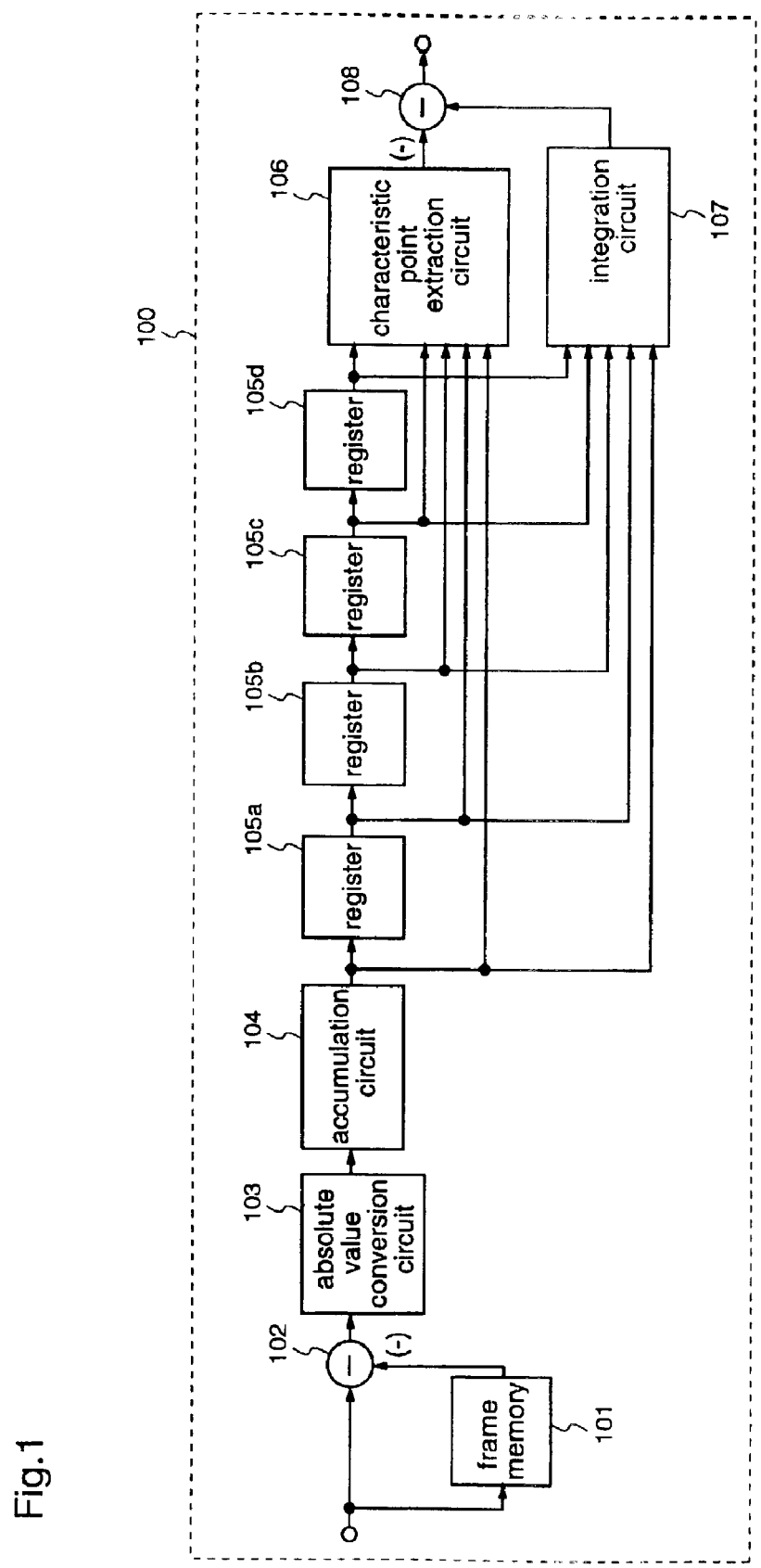
FIG. 1 is a block diagram illustrating a structure of an image motion detecting circuit according to a first embodiment of the present invention.

FIG. 1 is a block diagram illustrating an image motion detecting circuit 100 according to a first embodiment of the present invention. The image motion detecting circuit 100 includes a frame memory 101 for delaying an inputted image signal by a period corresponding to one frame, a subtracter 102 for calculating a level difference of pixels existing at the same spatial position in the inputted image signal between frames, an absolute value conversion circuit 103 for obtaining the absolute value of the level difference calculated by the subtracter 102 for each pixel, an accumulation circuit 104 which resets an accumulated value to zero at the head of a frame and accumulates the absolute values for each frame to obtain an accumulated value, N registers 105 (N is a natural number that is equal to or larger than 4) for holding accumulated values of N pieces of inter-frame difference absolute values for each frame, and a characteristic point extraction circuit 106 for extracting M accumulated values (M is a natural number that is equal to or larger than 1, and equal to or smaller than N/4) starting from the largest one, from the one accumulated value that is outputted from the accumulation circuit 104 and the N accumulated values held by the N registers 105, at the head of a frame. In the following descriptions, unless otherwise specified, the accumulated value refers to an accumulated value of the inter-frame difference absolute values. The image motion detecting circuit 100 further includes an integration circuit 107 and a subtracter 108, as means for adding the one accumulated value that is outputted from the accumulation circuit 104 and the N accumulated values which are held by the N registers 105, except for the M accumulated values which are extracted by the characteristic point extraction circuit 106. The integration circuit 107 adds the one accumulated value that is outputted from the accumulation circuit 104 and the N accumulated values which are held by the N registers 105 to obtain the sum. The subtracter 108 subtracts the M accumulated values which are extracted by the characteristic point extraction circuit 106 from the sum of the accumulated values, which is obtained by the integration circuit 107.

Here, the smallest number of frames which enables to effectively recognize the scene change due to connection of two image sequences is usually 6, and accordingly it is desirable that N should be a natural number that is equal to or larger than 4. Thus, in this first embodiment, the description will be given of a case where the image motion detecting circuit 100 is provided with four registers 105 (registers 105*a* to 105*d*), and detects a motion amount for a period corresponding to 6 frames.

The operation of the image motion detecting circuit 100 that is configured as described above will be described in more detail. Initially, an image signal is inputted. The inputted image signal is delayed in the frame memory 101 by a period corresponding to one frame as well as inputted to the subtracter 102. The subtracter 102 calculates a level difference of pixels existing at the same spatial position, from the inputted image signal and an output of the frame memory 101. The absolute conversion circuit 103 converts the pixel level difference between frames, calculated by the subtracter 102, into an absolute value. The accumulation circuit 104 accumulates the absolute values for each frame, to obtain the accumulated value of the inter-frame difference absolute values. Then, the accumulated value obtained by the accumulation circuit 104 is successively shifted in units of frames, and held by the four registers 105*a* to 105*d* which are connected in series. As a result of the aforementioned operation, four accumulated values held by the registers 105*a* to 105*d* as well as one accumulated value outputted from the accumulation circuit 104 are inputted to the characteristic point extraction circuit 106 and the integration circuit 107.

The characteristic point extraction circuit 106 extracts M accumulated values starting from the largest one, from the inputted five accumulated values. Considering a scene change due to connection of two image sequences for a period corresponding to (N+1) frames, it is effective when M is a natural number that is equal to or larger than 1 and equal to or smaller than N/4. Therefore, when the motion amount for the period corresponding to 6 frames is to be detected, the value of M is 1. Accordingly, the characteristic point extraction circuit 106 extracts the maximum value among the five accumulated values. In such case, for example when the image sequence comprises still pictures which are connected with each other, only an accumulated value of inter-frame difference absolute values at the so-called scene change where a different still picture successively follows has an extremely large value. Therefore, the extracted maximum value corresponds to the accumulated value of the inter-frame difference absolute values at the scene change. Meanwhile, the integration circuit 107 calculates the sum of the five accumulated values.

The maximum value that is extracted by the characteristic point extraction circuit 106 and the sum that is obtained by the integration circuit 107 are inputted to the subtracter 108. The subtracter 108 subtracts the maximum value from the sum of the five accumulated values. Thereby, the sum of four accumulated values except for the maximum value is calculated. The image motion detecting circuit 100 outputs this obtained sum as the motion amount of the whole image sequence.

As described above, when the image motion detecting circuit 100 obtains the motion amount for the period corresponding to 6 frames, the accumulated values of the inter-frame difference absolute values for the 6-frame period are added except for the maximum value, thereby detecting the motion amount of the whole image sequence. Therefore, when the motion amount of an image sequence which comprises still pictures being connected with each other is to be obtained, the motion amount can be detected with ignoring the scene change section. In an image sequence in which similar motions successively follow, e.g., still pictures or moving pictures successively follow, even when one of the plural accumulated values of the inter-frame difference absolute values is ignored, the detected motion amount of the whole image sequence is not affected.

An image motion detecting method which is performed by using the image motion detecting circuit 100 according to the first embodiment will be described with reference to FIG. 3. Initially, respective data in the registers 105, the accumulation circuit 104 and the frame memory 101 are initialized at 0 (step S301). Here, the description will be given assuming that the accumulated values held by the registers 105*a* to 105*d* in FIG. 1 are frame1, frame2, frame3 and frame4, successively from the register 105*a*, and the accumulated value held by the accumulation circuit 104 for each frame is frame0.

Then, an image signal is inputted in units of frames, and the frame head of the inputted image signal is judged (step S302). As a result of the judgement, when it is not the frame head, a difference (i.e., inter-frame difference) between a level of a pixel constituting one frame of the inputted image signal and a level of a pixel corresponding to the image signal that has been delayed in the frame memory 101 by one-frame period is calculated by the subtracter 102, and then the difference is converted into the absolute value by the absolute value conversion circuit 103, thereby calculating the inter-frame difference absolute value (pixel_abs_diff) (step S307). This pixel_abs_diff is constantly calculated for pixels corresponding to one-frame period. Then, pixel_abs_diff are accumulated by the accumulation circuit 104, thereby calculating an accumulated value of the inter-frame difference absolute values (frame_abs_diff) (step S308). This frame_abs_diff is used when pixel_abs_diff are accumulated by the accumulation circuit 104 for the one-frame period.

On the other hand, when the result of the judgement in step S302 indicates that it is the frame head, frame_abs_diff calculated by the accumulation circuit 104 is held as frame0 for each frame. Further, the accumulated values which are held by the registers 105*a* to 105*d* for each frame are successively shifted and held. More specifically, by this shifting operation, frame0 that has been held for each frame is substituted for frame1, frame1 for frame2, frame2 for frame3, and frame3 for frame4 (step S303).

Next, the maximum value (frame_max) is extracted by the characteristic point extraction circuit 106 from the accumulated values of the inter-frame difference absolute values, being held by the accumulation circuit 104 as frame0 and held by the registers 105*a* to 105*d* as frame1, frame2, frame3 and frame4 (step S304). Then, the sum of the five accumulated values (frame0 to frame4) is obtained by the integration circuit 107, and the maximum value extracted by the characteristic point extraction circuit 106 is subtracted by the subtracter 108 from the sum that is obtained by the integration circuit 107, thereby detecting the motion amount of the whole image (step S305). Finally, frame_abs_diff that is constantly used in the calculation to accumulate the inter-frame difference absolute values is reset at 0.

As described above, according to the image motion detecting circuit or the image motion detecting method of the first embodiment, the maximum value is extracted from inter-frame difference absolute values for a predetermined frame period of the input image signal, as well as the inter-frame difference absolute values for the predetermined frame period are added except for the maximum value, thereby detecting the motion of the whole image sequence. Therefore, the motion of the whole image sequence can be detected while eliminating a specific value calculated at the scene change, whereby the accuracy in detecting the image motion can be increased.

In this first embodiment, when the motion amount corresponding to the 6-frame period is detected, five accumulated values of the inter-frame difference absolute values are added except for the maximum value, and the obtained sum is detected as the motion amount of the whole image sequence. However, in such a system in which the detection delay can be further lengthened, the image motion detecting circuit 100 can detect the motion amount of the whole image sequence employing a larger number of accumulated values. Because this case in which the detection delay can be further lengthened includes a larger number of scene changes, the motion amount should be detected with not only eliminating the maximum value but eliminating some number of values starting from the largest one. For example, when the motion amount of the whole image sequence is detected using the accumulated values of ten inter-frame difference absolute values, a value that is obtained by eliminating two accumulated values of the inter-frame difference absolute values starting from the largest one is obtained as the motion amount of the whole image sequence. In this case, the image motion detecting circuit 100 as shown in FIG. 1 is provided with nine registers 105, in which the characteristic point extraction circuit 106 extracts two accumulated values starting from the largest one, from the ten accumulated values of the inter-frame difference absolute values, and the integration circuit 107 calculates the sum of the ten accumulated values of the inter-frame difference absolute values. Then, the subtracter 108 subtracts the sum of the extracted two accumulated values from the sum of the ten accumulated values, to detect the motion amount of the whole image sequence.

[Embodiment 2]

Figure 2:
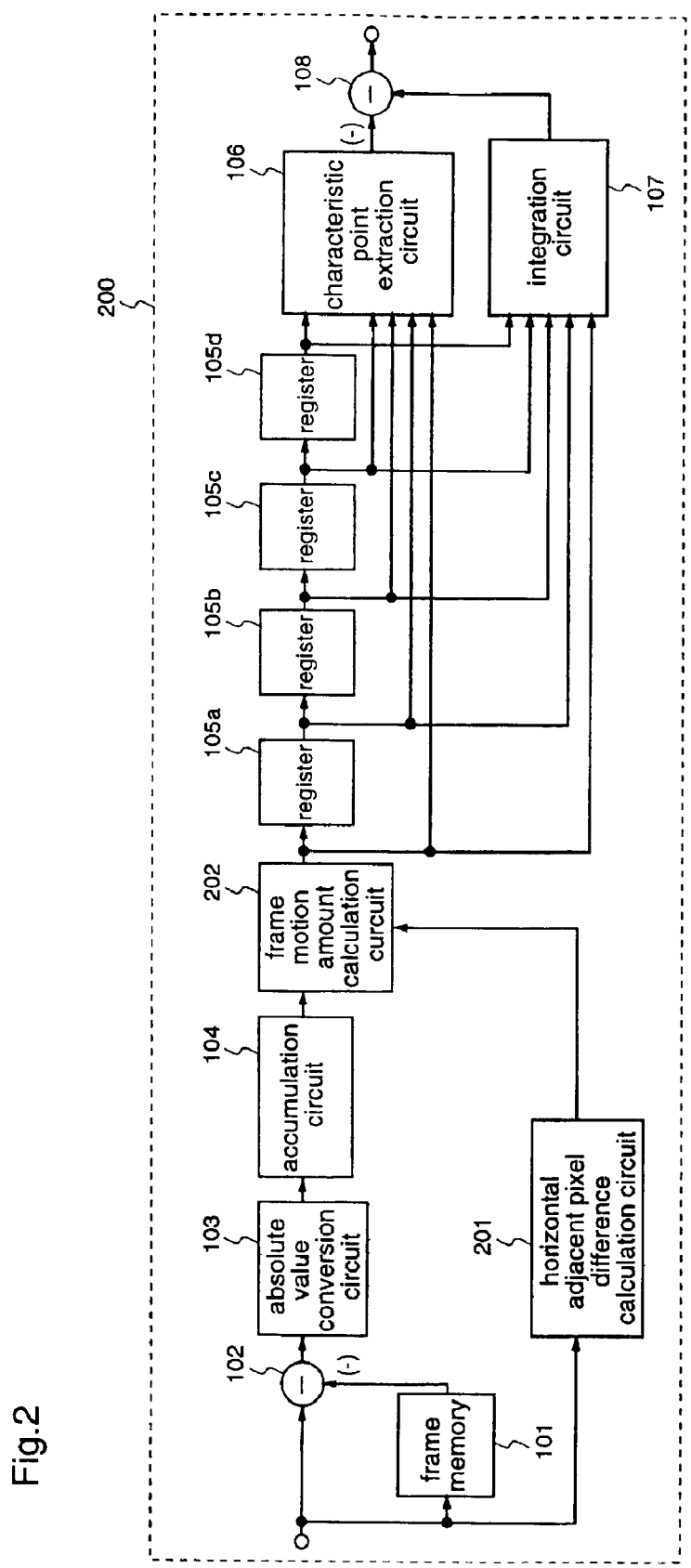
FIG. 2 is a block diagram illustrating a structure of an image motion detecting circuit according to a second embodiment of the present invention.
Figure 3:
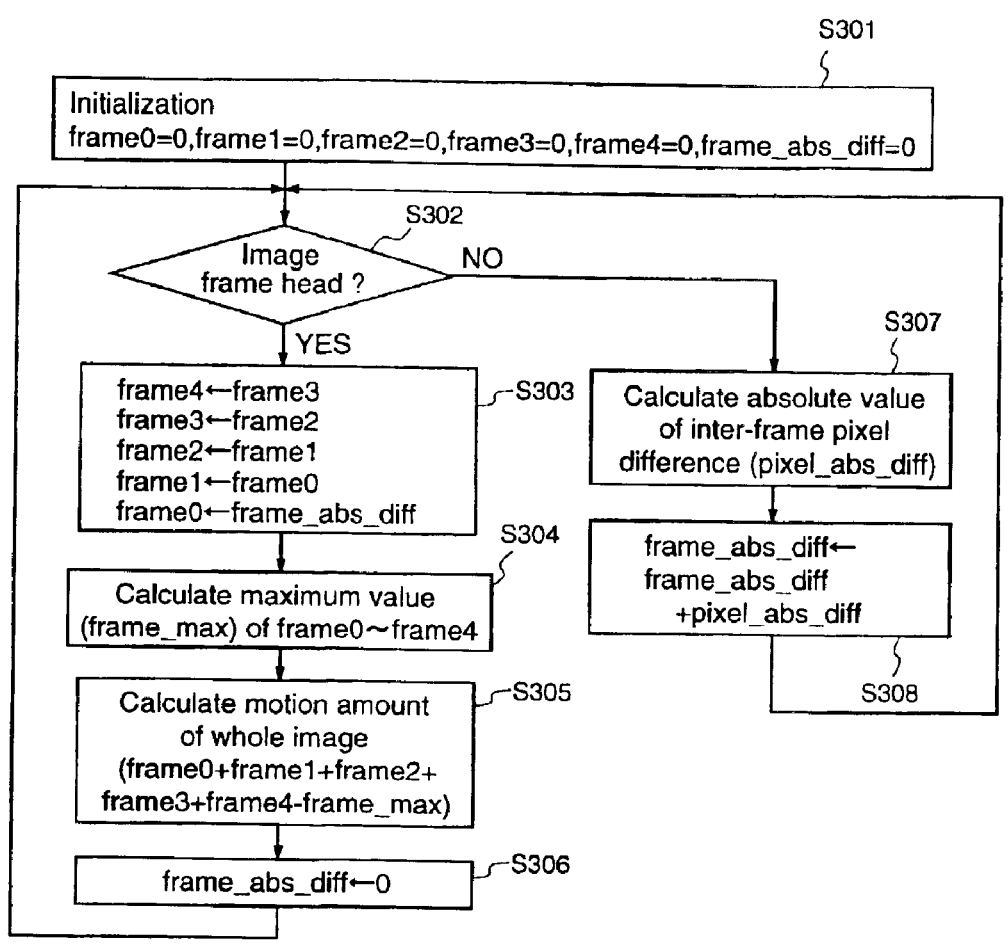
FIG. 3 is a flowchart for explaining an image motion detecting method according to the first embodiment.
Figure 4:
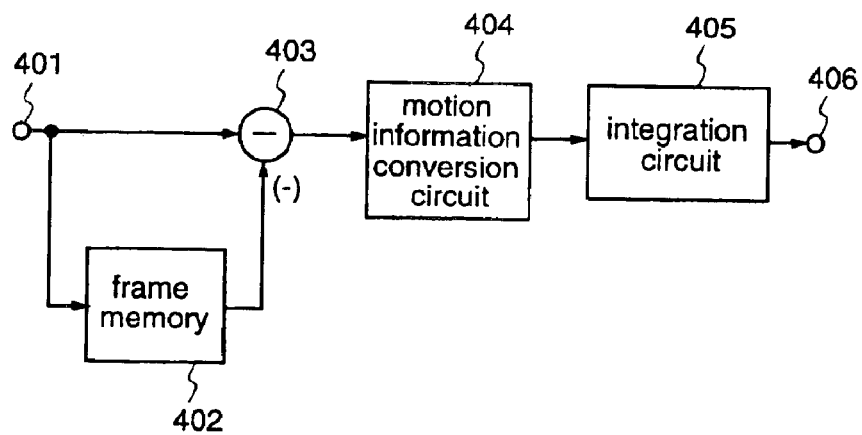
FIG. 4 is a block diagram illustrating a structure of a prior art motion detecting circuit.

FIG. 2 is a block diagram illustrating a structure of an image motion detecting circuit 200 according to a second embodiment of the present invention. The same elements in the image motion detecting circuit 100 as shown FIG. 1 are given the same reference numerals, and their descriptions are omitted here. In this second embodiment, like in the first embodiment, the image motion detecting circuit 200 is provided with four registers 105 (registers 105a to 105d), and detects a motion amount during a period corresponding to 6 frames.

The image motion detecting circuit 200 according to the second embodiment is different from the image motion detecting circuit 100 in that the detecting circuit 200 includes, as shown in FIG. 2, a horizontal adjacent pixel difference calculation circuit 201 and a frame motion amount calculation circuit 202. The horizontal adjacent pixel difference calculation circuit 201 accumulates horizontal adjacent pixel differences of an input image signal for each frame to obtain an accumulated value (H). The frame motion amount calculation circuits 202 corrects an accumulated value (F) of the inter-frame difference absolute values using the accumulated value (H), thereby calculating the frame motion amount.

The operation of the image motion detecting circuit 200 according to the second embodiment will be described in more detail. Initially, an image signal is inputted. The inputted image signal is delayed in the frame memory 101 by a period corresponding to one frame as well as inputted to the subtracter 102. The subtracter 102 calculates a level difference of pixels existing at the same spatial position, from the inputted image signal and an output of the frame memory 101. The absolute value conversion circuit 103 converts the pixel level difference between frames, that is calculated by the subtracter 102, into the absolute value. The accumulation circuit 104 accumulates the absolute values for each frame, thereby obtaining an accumulated value (F) of the inter-frame difference absolute values. The horizontal adjacent pixel difference calculation circuit 201 calculates the horizontal adjacent pixel difference from the inputted image signal of each frame, and accumulates the differences for each frame, thereby calculating an accumulated value (H).

The frame motion amount calculation circuit 202 receives the accumulated value (F) and the accumulated value (H), and calculates the motion amount for each frame. This calculation can be performed by obtaining a ratio between F and H, for example F/H (here, H is a value other than zero). Accordingly, when an image having a higher spatial frequency (i.e., when H has a larger value) is moved even slightly, F has quite a large value. On the other hand, in the case of an image having a lower spatial frequency (i.e., when H has a smaller value), even when the image is moved in the similar manner, the value of F can be corrected and prevented from becoming small.

The motion amount for each frame, calculated by the frame motion amount calculation circuit 202, is thereafter successively shifted in units of frames, and held by the register 105a to 105d which are connected in series. As a result of the above operation, four frame motion amounts which are held by the registers 105a to 105d and one frame motion amount that is outputted from the accumulation circuit 104 are inputted to the characteristic point extraction circuit 106 and the integration circuit 107.

The characteristic point extraction circuit 106 extracts M accumulated values starting from the largest one, from the inputted five accumulated value. Considering a scene change due to the connection of two image sequences for a period corresponding to (N+1) frames, it is effective when M is a natural number that is equal to or larger than 1, and equal to or smaller than N/4. Therefore, when the motion amount corresponding to the 6-frame period is detected, the value of M is 1. In this case, for example when an image sequence comprises still pictures which are connected with each other, only the frame motion amount at the so-called scene change where a different still pictures successively follows has quite a large value. Therefore, the extracted maximum value corresponds to a frame motion amount at the scene change. Meanwhile, the integration circuit 107 calculates the sum of the inputted five frame motion amounts.

The maximum value that is extracted by the characteristic point extraction circuit 106 and the sum that is obtained by the integration circuit 107 are inputted to the subtracter 108. The subtracter 108 subtracts the maximum value from the sum of the five frame motion amounts. Thereby, the sum of four frame motion amounts among the five frame motion amounts, except the maximum value, is calculated. The image motion detecting circuit 200 outputs this obtained sum as the motion amount of the whole image sequence.

Next, an image motion detecting method that is performed by using the image motion detecting circuit 200 according to the second embodiment will be described with reference to FIG. 3. This image motion detecting method is different from the image motion detecting method as described in the first embodiment in following points. First, a process in a case where it is judged, in step S302 shown in FIG. 3, that this is not the frame head is different from that in the first embodiment. To be more specific, the process of step S307 is carried out, and further an accumulated value of the horizontal adjacent pixel differences of the inputted image signal is obtained by the horizontal adjacent pixel difference calculation circuit 201, and an frame motion amount is obtained by the frame motion amount calculation circuit 202 from frame_abs_diff that is obtained in step S308 and the accumulated value of the horizontal adjacent pixel differences. Thereafter, for the obtained frame motion amount, the processes of steps S303 to S306 as described in the first embodiment are carried out.

As described above, according to the image motion detecting circuit or the image motion detecting method according to the second embodiment, the motion amount corresponding to each frame is extracted from the inter-frame difference absolute value and the accumulated value of the horizontal adjacent pixel differences for each frame of the input image signal, then the maximum value among frame motion amounts during a predetermined frame period is extracted, as well as the frame motion amounts in the predetermined frame period are added except for the maximum value, thereby detecting the motion of the whole image sequence. Therefore, the motion of the whole image sequence can be detected with eliminating a specific value that is calculated at the scene change, whereby the accuracy in detecting the image motion can be increased.

In this second embodiment, when the motion amount corresponding to the 6 frame period is to be detected, five frame motion amounts are added except for the maximum value, and the obtained sum is detected as the motion amount of the whole image sequence. However, in such a system in which the detection delay can be further lengthened, the image motion detecting circuit 200 can detect the motion amount of the whole image sequence employing a larger number of frame motion amounts. Because this case in which the detection delay can be further lengthened includes a larger number of scene changes, the motion amount should be detected with not only eliminating the maximum value but eliminating some number of values starting from the largest one. For example, when the motion amount of the whole image sequence is to be detected using the ten frame motion amounts, two frame motion amounts are eliminated starting from the largest one, thereby detecting the motion amount of the whole image sequence. In this case, the image motion detecting circuit 200 as shown in FIG. 2 is provided with nine registers 105, in which the specific extraction circuit 106 extracts two frame motion amounts starting from the largest one, from the ten frame motion amounts, and the integration circuit 107 calculates the sum of the ten frame motion amounts. Then, the subtracter 108 subtracts the sum of the extracted two frame motion amounts from the sum of the ten frame motion amounts, to detect the motion amount of the whole image sequence.

What is claimed is:

1. An image motion detecting circuit including:
a first extraction means for extracting an inter-frame difference absolute value from an inputted image signal in units of frames;
N pieces (N is a natural number that is equal to or larger than 4) of holding means each holding the inter-frame difference absolute value;
a second extraction means for extracting M pieces (M is a natural number that is equal to or larger than 1 and equal to or smaller than N/4) of the inter-frame difference absolute values starting from a largest one, from among the one inter-frame difference absolute value that is extracted by the first extraction means and the N pieces of inter-frame difference absolute values which are held by the holding means; and
an addition means for adding the (N+1) pieces of inter-frame difference absolute values, except for the extracted M pieces of inter-frame difference absolute values.

2. An image motion detecting circuit including:
a first extraction means for extracting an inter-frame difference absolute value from an inputted image signal in units of frames;
a second extraction means for extracting an accumulated value of horizontal adjacent pixel differences from the inputted image signal in units of frames;
a calculation means for calculating a frame motion amount from the inter-frame difference absolute value and the accumulated value of the horizontal adjacent pixel differences;
N pieces (N is a natural number that is equal to or larger than 4) of holding means each holding the frame motion amount;
a third extraction means for extracting M pieces (M is a natural number that is equal to or larger than 1 and equal to or smaller than N/4) of the frame motion amounts starting from a largest one, from among the one frame motion amount that is calculated by the calculation means and the N pieces of frame motion amounts which are held by the holding means; and
an addition means for adding the (N+1) pieces of frame motion amounts, except for the extracted M pieces of frame motion amounts.

3. An image motion detecting method including:
a first extraction step of extracting an inter-frame difference absolute value from an inputted image signal in units of frames;
a holding step of holding N pieces (N is a natural number that is equal to or larger than 4) of the inter-frame difference absolute values;
a second extraction step of extracting M pieces (M is a natural number that is equal to or larger than 1 and equal to or smaller than N/4) of the inter-frame difference absolute values starting from a largest one, from among the one inter-frame difference absolute value that is extracted in the first extraction step and the N pieces of inter-frame difference absolute values which are held in the holding step; and
an addition step of adding the (N+1) pieces of inter-frame difference absolute values, except for the extracted M inter-frame difference absolute values.

4. An image motion detecting method including:
a first extraction step of extracting an inter-frame difference absolute value from an inputted image signal in units of frames;
a second extraction step of extracting an accumulated value of horizontal adjacent pixel differences from the inputted image signal in units of frames;
a calculation step of calculating a frame motion amount from the inter-frame difference absolute value and the accumulated value of the horizontal adjacent pixel differences;
a holding step of holding N pieces (N is a natural number that is equal to or larger than 4) of the inter-frame motion amounts;
a third extraction step of extracting M pieces (M is a natural number that is equal to or larger than 1 and equal to or smaller than N/4) of the frame motion amounts starting from a largest one, from among the one frame motion amount that is calculated in the calculation step and the N pieces of frame motion amounts which are held in the holding step; and
an addition step of adding the (N+1) pieces of frame motion amounts, except for the extracted M pieces of frame motion amounts.

* * * * *